United States Patent [19]
Snavely, Jr. et al.

[11] 3,918,521
[45] Nov. 11, 1975

[54] PETROLEUM PRODUCTION BY STEAM INJECTION

[75] Inventors: Earl S. Snavely, Jr., Arlington, Tex.; Theodore A. Bertness, Whittier, Calif.

[73] Assignee: Mobil Oil Corporation, New York, N.Y.

[22] Filed: June 24, 1974

[21] Appl. No.: 482,815

Related U.S. Application Data

[63] Continuation-in-part of Ser. No. 326,929, Jan. 26, 1973, Pat. No. 3,844,349.

[52] U.S. Cl.................................. 166/272; 423/242
[51] Int. Cl.² ..................... E21B 43/24; C01B 17/62; C01F 11/48
[58] Field of Search ........ 166/303, 272; 210/42, 45, 210/59, 65, 70; 423/242

[56] References Cited
UNITED STATES PATENTS

| | | | |
|---|---|---|---|
| 895,612 | 8/1908 | Baker............................ | 166/272 X |
| 1,271,899 | 7/1918 | Howard et al. ............. | 423/215.5 X |
| 1,422,204 | 7/1922 | Hoover et al. .................. | 166/272 X |
| 2,073,039 | 3/1937 | Wilton et al. ....................... | 423/242 |
| 2,113,198 | 4/1938 | Nonhebel et al. .................. | 423/242 |
| 2,813,583 | 11/1957 | Marx et al. ..................... | 166/272 X |
| 3,193,009 | 7/1965 | Wallace et al. .................... | 166/272 |
| 3,687,613 | 8/1972 | Rickard ............................. | 423/242 |
| 3,808,324 | 4/1974 | Urban............................... | 210/59 X |
| 3,808,325 | 4/1974 | Urban............................... | 210/59 X |

*Primary Examiner*—Stephen J. Novosad
*Attorney, Agent, or Firm*—C. A. Huggett; Henry L. Ehrlich

[57] ABSTRACT

This specification discloses a method of producing petroleum from a petroleum-bearing formation. A heated fluid is generated in a heated fluid generator that is fired with a sulfur-containing fuel and the heated fluid is injected into the petroleum-bearing formation and petroleum is produced therefrom. The firing of the heated fluid generator with the sulfur-containing fuel produces a flue gas which contains sulfur oxides. The flue gas is passed through an emission scrubber vessel in counterflow with an alkaline water containing calcium ions to scrub the sulfur oxides from the flue gas, to reduce the alkalinity of the alkaline water and to form calcium sulfite. An oxidation inhibitor is added to inhibit the oxidation of the calcium sulfite. The scrubbed flue gas and the water of the reduced alkalinity are discharged from the emission scrubber vessel and the calcium sulfite is separated by mechanical means from the water of reduced alkalinity.

4 Claims, 2 Drawing Figures

PETROLEUM PRODUCTION BY STEAM INJECTION

CROSS REFERENCE TO RELATED APPLICATION

This is a continuation-in-part of application Ser. No. 326,929, filed Jan. 26, 1973, now U.S. Pat. No. 3,844,349.

BACKGROUND OF THE INVENTION

This invention is directed to a method of producing petroleum from a petroleum-bearing formation. More particularly, this invention is directed to a method of producing petroleum from a petroleum-bearing formation wherein there is injected into the formation a heated fluid that is generated by firing a heated fluid generator with a sulfur-containing fuel and thereby emitting a flue gas containing sulfur oxides.

In the production of heated fluid for use in a heated fluid stimulation oil recovery method, water is injected into a heated fluid generator as feed water and fuel is burned to supply heat to heat the water. Sufficient fuel, such as gas or oil, may be burned in the heated fluid generator to convert the water injected thereinto into steam. The heated fluid is then injected via an injection well into a producing formation.

In the burning of a fuel in a heated fluid generator, a flue gas is produced which has in the past normally been vented to the atmosphere. However, in the burning of a sulfur-containing fuel, the flue gas contains sulfur oxides which desirably should not be vented to the atmosphere.

In an article published in CHEMICAL WEEK, Sept. 2, 1970, entitled "Smokestack Oxides May Get Sea-Water Scrubbing", there is described a process that uses sea water to scrub sulfur oxides from power plant smokestack gases. In accordance with this process, sea water is contacted with gases containing sulfur dioxide and the sulfur dioxide is removed therefrom. An earlier reference that is directed to removing sulfur dioxide from furnace gases is U.S. Pat. No. 1,271,899 to Henry Howard et al. Howard et al. describes a process wherein furnace gases are first treated to remove dust and sulfur trioxide therefrom. The partially purified gas mixture is then brought into contact in a scrubbing tower with a dilute solution of alkali which effectually removes the greater part of the sulfur dioxide and yields a harmless exit gas and a dilute solution of sodium sulfite.

SUMMARY OF THE INVENTION

This invention is directed to a method of producing petroleum from a petroleum-bearing formation penetrated by a well means. A hot fluid is generated by injecting feed water into a hot fluid generator and firing the hot fluid generator with a sulfur-containing fuel thereby emitting a flue gas containing sulfur oxides. The hot fluid is injected via the well means into the petroleum-bearing formation and petroleum is produced via the well means from the petroleum-bearing formation. The flue gas containing sulfur oxides is passed through an emission scrubber vessel. An oxidation inhibitor is injected into an alkaline water that contains calcium ions and the alkaline water containing the calcium ions and oxidation inhibitor is passed through the emission scrubber vessel in counterflow with the flue gas to scrub the sulfur oxides from the flue gas, to reduce the alkalinity of the alkaline water, to form calcium sulfite and to inhibit the oxidation of the calcium sulfite. The pH of the water of reduced alkalinity that is discharged from the emission scrubber vessel is maintained at a value of at least 6. The scrubbed flue gas and the water of reduced alkalinity containing calcium sulfite are discharged from the emission scrubber vessel and the calcium sulfite is separated by mechanical means from the water of reduced alkalinity.

An embodiment of this invention is directed to a method of treating water that contains calcium ions and oxygen. Sulfur dioxide is injected into the water in an amount sufficient to react with the calcium ions and form calcium sulfite. An oxidation inhibitor is injected into the water in amounts sufficient to inhibit the oxidation of the calcium sulfite to calcium sulfate and the calcium sulfite is separated from the water.

DESCRIPTION OF THE PREFERRED EMBODIMENTS

This invention is directed to a method of producing petroleum from a petroleum-bearing formation by injecting a heated fluid into the formation, the heated fluid being generated by firing a heated fluid generator with a sulfur-containing fuel and thereby emitting a flue gas containing sulfur oxides and scrubbing the flue gas with an alkaline water to remove the sulfur oxides therefrom.

A heated fluid that is commonly employed is steam of about 80 percent quality. However, other heated fluids may be employed. For example, heated water is a preferred heated fluid for some applications. The water may be heated directly by the heat generated in firing the heated fluid generator or, if desired, by using high temperature steam generated by the heated fluid generator to heat large volumes of water to temperatures less than the temperature of the steam. For example, high temperature steam may be generated and mixed with water to heat the water to a desired temperature, e.g., about 350° F., after which the heated water is injected into the formation. For simplicity in describing this invention hereafter when reference is made to steam it is to be understood to encompass other heated fluids and, in particular, heated water. Likewise, when reference is made to a steam generator it is to be understood to encompass other heated fluid generators.

Figure 1:
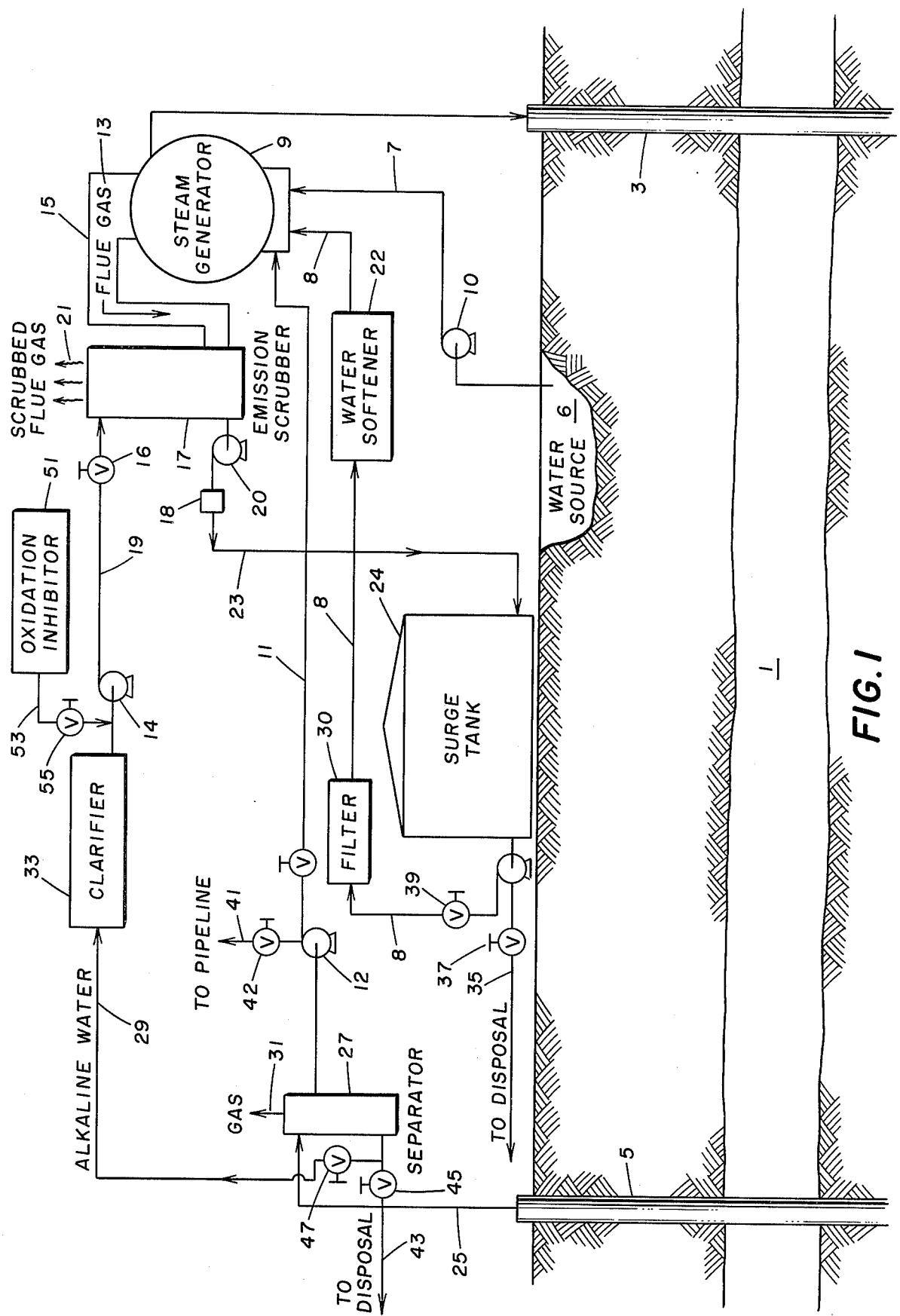
FIG. 1 is a schematic flow diagram illustrating a method of this invention.

As was described in the copending U.S. Pat. application Ser. No. 326,929, filed Jan. 26, 1973, now U.S. Pat. No. 3,844,349 by Earl S. Snavely, Jr. and Theodore A. Bertness, there is shown with reference to FIG. 1 a petroleum-bearing formation 1 penetrated by a well means here illustrated as an injection well 3 and production well 5 though the well means may take the form of a single well or a plurality of wells. Water from a water source 6 is pumped by pump 10 through line 7 and into a steam generator 9 as generator feed water. A sulfur-containing fuel is fired in the steam generator to convert the feed water into steam. The sulfur-containing fuel may be, for example, pumped by pump 12 through line 11 and into the steam generator 9 where it is burned to heat the feed water and generate steam. The burning of the sulfur-containing fuel in the steam generator 9 produces a flue gas 13 which contains sulfur oxides and in particular sulfur dioxide ($SO_2$). The flue gas 13 is flowed through a conduit 15 and into an emission scrubber vessel 17. An alkaline water is pumped by pump 14 through line 19 and into the emission scrubber vessel 17. The pump 14 may be a variable speed pump and line 19 may be provided with a valve 16 whereby the rate of flow of the alkaline water into the emission scrubber vessel 17 may be controlled. The flue gas 13 containing sulfur oxides and the alkaline water are flowed through the emission scrubber vessel 17 in counterflow one with the other end and the sulfur oxides are scrubbed from the flue gas. The scrubbed flue gas 21 is discharged from the emission scrubber vessel and may be vented to the atmosphere. The alkaline water, in passing through the emission scrubber vessel 17 in counterflow with the flue gas 13, is reduced in alkalinity. It is desirable to maintain the pH of the water of reduced alkalinity exiting from the emission scrubber vessel 17 via line 23 at a predetermined value. The pH of the water exiting from the emission scrubber vessel 17 may be determined, for example, by a pH meter 18 provided in communication with line 23. The pH of the alkaline water flowing through the emission scrubber vessel and exiting therefrom may be controlled by controlling the flow rate of the alkaline water through the emission scrubber vessel, for example, the slower the flow rate the lower the pH of the alkaline water exiting from the emission scrubber vessel. This flow rate may be controlled for example by controlling the variable speed pump 14 or the valve 16 in line 19 leading to the emission scrubber vessel. Also, there may be provided in line 23 leading from the emission scrubber vessel a pump 20 which may be a variable speed pump and a valve (not shown), either of which may be used to control the flow rate of the alkaline water from the emission scrubber vessel. Alkalis may also be added if needed to increase the pH. The water of reduced alkalinity that is discharged from the emission scrubber vessel 17 through line 23 may be recirculated (not shown), particularly if the pH is high, through the emission scrubber vessel 17 and then may be collected in the surge tank 24.

The characteristics of the water exiting from the emission scrubber vessel vary with the pH value of the water. For example, the corrosiveness of the water increases greatly at pH values of less than 5. At the same time the solubility of suspended matter in the water increases with decreasing pH values. In particular, most scales which may be formed, for example, in the emission scrubber vessel, lines leading therefrom, and other associated equipment are more soluble in lower pH waters. Therefore, it is desirable to maintain the pH of the water exiting from the emission scrubber vessel at a predetermined pH value in order to control the characteristics of the water. When it is desirable to minimize the corrosive characteristics of the water, then a predetermined pH value of at least 5.0 and preferably at least 6.0 is selected. However, when it is desirable to dissolve scale or other foreign matter, a predetermined pH value of less than 5 is selected.

This water of reduced alkalinity is particularly suitable for use as generator feed water due to improved clarity and reduced tendency to form scales that result from the scrubbing action in the emission scrubber vessel, and has been found to be more suitable in some areas than available fresh water. Further, the use of this water as feed water reduces the amount of fresh water needed for the steam generator and thereby conserves available fresh water supplies. Also, the use of this water as feed water reduces the volume of water which must be disposed of, generally by injecting into disposal wells (not shown). In accordance with this invention, at least a portion of the water of reduced alkalinity is flowed from the surge tank 24 via line 8 and valve 39 into the steam generator 9 as feed water or make up water, thereby reducing the need for additional feed water from the water source 6. The water of reduced alkalinity may be treated by passing it through a filter 30 and water softener 22 prior to injecting it into the steam generator 9 as generator feed water. The excess water in the surge tank 24 may be flowed via line 35 and valve 37 to disposal facilities, such as disposal wells (not shown).

The reactions that take place in scrubbing sulfur dioxide from flue gas by contacting the flue gas with an aqueous alkaline solution of soluble bicarbonates are as follows:

$$CO_3^= + CO_2 + H_2O \rightleftarrows 2\ HCO_3^- \qquad (1)$$

$$SO_2 + 2HCO_3^- \rightarrow SO_3^= + 2CO_2 + H_2O \qquad (2)$$

$$SO_3^= + \tfrac{1}{2} O_2 \rightarrow SO_4^= \qquad (3)$$

Insoluble carbonates, such as calcium carbonate ($CaCO_3$) may be dissolved by contact with carbonated water as follows:

$$CaCO_3 + CO_2 + H_2O \rightarrow Ca^{++} + 2HCO_3^- \qquad (4)$$

The solution of equation (4) may then be used to scrub $SO_2$ as given in equations (2) and (3).

In the emission scrubber the calcium ions present in the alkaline water combine with the sulfite ions to form calcium sulfite ($CaSO_3$) which in turn is oxidized to calcium sulfate ($CaSO_4$). Calcium sulfate is soluble in the water which exits from the emission scrubber. It is desirable to remove the calcium ions therefrom to avoid scaling problems, particularly when this water is to be used as feed water for the steam generator. As previously described, a water softener is commonly used for treating the water to remove the calcium ions and particularly the calcium sulfate therefrom, but such treatments are quite expensive when large volumes of water are required to be treated. In accordance with this invention, an oxidation inhibitor is provided in the emission scrubber to inhibit the oxidation shown by equation (3) of the sulfite ions to sulfate ions. The oxidation inhibitor may be injected into the alkaline water prior to the emission scrubber or may be injected directly into the emission scrubber. The oxidation inhibitor inhibits the oxidation of the calcium sulfite to calcium sulfate and the calcium sulfite being relatively insoluble is removed from the water by mechanical means such as by settling, filtering, or centrifuging.

Referring again to FIG. 1, there is shown an oxidation inhibitor source 51. A line 53 interconnects the oxidation inhibitor source 51 with line 19 through which alkaline water is flowed to the emission scrubber 17. A valve 55 is provided in line 53 for controlling the amounts of oxidation inhibitor injected into the alkaline water flowing through line 19 and to the emission scrubber 17. Suitable oxidation inhibitors which may be employed include ascorbic acid, formaldehyde, benzyl alcohol, phenol, and hydroquinone. The oxidation inhibitors should be used in sufficient concentration to greatly reduce the reaction rate of the sulfite ion with oxygen. The actual amount of oxidation inhibitor which should be added to inhibit the oxidation of calcium sulfite to calcium sulfate will depend upon such things as the amount of calcium sulfite and oxygen that is present and the temperatures involved. Normally, however, the oxidation inhibitor should be injected in an amount sufficient to provide a concentration of at least one part per million of the alkaline water and normally no substantially increased benefits are obtained by providing an oxidation inhibitor concentration of greater than 5 parts per million. The oxidation inhibitor mixes with the alkaline water in the line 19 or emission scrubber 17 and inhibits the oxidation of $CaSO_3$ to $CaSO_4$ when the flue gas 13 mixes with the alkaline water in the emission scrubber 17. The $CaSO_3$ and alkaline water then are flowed from the emission scrubber 17 to the surge tank 24 where much of the $CaSO_3$ settles out and is removed therefrom (not shown). Water from the surge tank 24 may then be flowed via line 8 through the filter 30 or other mechanical separation means such as a hydrocyclone (not shown) to remove any remaining insoluble $CaSO_3$ therefrom. The water is then sufficiently soft for many purposes. For other purposes where further softening may be required, as for example when the water is used as feed water for the steam generator 9, less softening by the water softener 22 is required. Thus a water softener of less capacity may be used, allowing the water to be softened more economically.

The function of the emission scrubber is to provide sufficient contact between the flue gas and the alkaline water in order to react the sulfur oxides and particularly the sulfur dioxide in the flue gas with the alkalinity of the water flowing through the unit. The size and particular design of the scrubber are dependent upon the reaction rate, the alkalinity of the water, and the volume of water needed to react with the sulfur oxides in the volume of flue gas to be scrubbed. The emission scrubber may be designed to employ, for example, Nutter V Slot trays or porcelain saddle packing to provide the contact between the flue gas and the alkaline water.

By use of the term "alkaline water" is meant a water which has basic properties, that is, that it will neutralize an acid by reaction of the basic components of the water with the acid to form salts. In water analysis, alkalinity represents the carbonates, bicarbonates, hydroxides and occasionally the borates, silicates and phosphates in the water. The water should contain sufficient alkalinity to react with all of the sulfur oxides contained in the flue gas as the alkaline water and flue gas pass in counterflow one with the other through the emission scrubber vessel. The optimum alkalinity in the water depends, among other things, upon the amount of sulfur oxides in the flue gas, the flow rates of the flue gas and alkaline water through the emission scrubber, and the efficiency of the emission scrubber.

In the burning of a sulfur-containing fuel to generate steam for a steam stimulation oil recovery process very large amounts of sulfur oxides are formed, thereby requiring very large amounts of alkali to react with and remove the sulfur oxides. For example, a steam stimulation process in an oil field may easily employ as many as 25 fuel-fired steam generators which each burns 80 barrels of fuel per day. The burning of fuel containing 2.5 percent sulfur in these steam generators would produce 30,000 pounds of $SO_2$ per day. To remove 80 percent of this amount of $SO_2$ by using limestone as a source of the alkali would require about 37,000 pounds per day of limestone and would produce as a by-product about 44,400 pounds of calcium sulfite ($CaSO_3$) to be disposed of.

In a copending application, Ser. No. 326,930, filed Jan. 26, 1973, entitled PROCESS FOR TREATING FLUE GASES TO REDUCE AIR POLLUTION, by Theodore A. Bertness and Earl S. Snavely, Jr., now abandoned, there is described a process wherein alkalinity for scrubbing a flue gas is supplied by providing a well means that extends into the earth and penetrates a subsurface formation and providing alkaline water therefrom. The subsurface formation may contain therein an alkaline water or salts from the groups of the alkaline earth metals and alkali metals. Where the formation contains alkaline salts the alkaline water is produced in situ by passing water via the well means into the formation to leach or dissolve the alkaline salt therefrom and form alkaline water which is then produced from the formation via the well means. Soluble alkaline salts such as sodium carbonate ($NaCO_3$) and potassium carbonate ($K_2CO_3$) are directly soluble in water. Insoluble salts such as calcium carbonate ($CaCO_3$) may be dissolved in a water which contains carbon dioxide dissolved therein.

In accordance with an embodiment of this invention, fluids are produced from the petroleum-bearing formation 1 via the production well 5 which fluids include petroleum having sulfur therein and alkaline water that contains calcium ions. The produced fluids are flowed through line 25 to a separator 27 and there separated. The produced petroleum having sulfur therein may be flowed from separator 27 via pump 12 and line 11 to the steam generator 9 and there burned as fuel, emitting a flue gas 13 having sulfur oxides. The petroleum in excess of that required for firing the steam generator may be flowed via line 41 and valve 42 to a pipeline or storage facilities (not shown). The produced alkaline water having calcium ions may be flowed from the separator 27 via line 29, valve 47, clarifier 33, pump 14, and line 19 and into the emission scrubber vessel 17 and there employed for scrubbing the sulfur oxides from the flue gas 13 as previously described. An oxidation inhibitor is flowed from the oxidation inhibitor source 51 via line 53 and valve 55 and is injected into the clarified alkaline water having calcium ions. As the flue gas containing sulfur oxides is flowed through the emission scrubber vessel in counterflow with the clarified alkaline water having calcium ions and the oxidation inhibitor the sulfur oxides are scrubbed from the flue gas, the alkalinity of the alkaline water is reduced, calcium sulfite is formed and the oxidation of the calcium sulfite to calcium sulfate is inhibited. Any excessive amounts of alkaline water may be flowed via line 43 and valve 45 to disposal facilities such as disposal wells (not shown).

The clarifier 33 may be a depurator vessel through which gas or air as a flotation aid is forced in diffused bubbles through the produced alkaline water to thereby clarify the alkaline water. In the operation of a depurator vessel through which air was passed through the alkaline water on a once-through basis, severe and rapid scaling occurred in the depurator vessel and associated lines. An analysis of this scaling problem indicated that the scaling occurred due to the air stripping of the carbon dioxide which was present in the produced water. The scaling problem was overcome by closing the depurator vessel and recycling the air that was used in the flotation process. The depurator vessel was charged initially with carbon dioxide to further aid in overcoming the scaling problem. charging the depurator vessel with carbon dioxide at atmospheric pressure was found sufficient though lesser or greater amounts of carbon dioxide could be used to charge the vessel.

In accordance with another embodiment of this invention there is provided a method and system for softening waters and, more particularly, for removing calcium ions from hard water to thereby soften the water. In accordance with this embodiment, the water is contacted with sulfur dioxide which is usually in gaseous form. When the $SO_2$ dissolves in the water the sulfite ion ($SO_3^=$) is formed in accordance with equation (5).

$$SO_2 + H_2O \rightarrow 2H^+ + SO_3^=$$

(5)

The sulfite ions react with the calcium ions in the water to form calcium sulfite in accordance with equation (6).

$$Ca^{++} + SO_3^= \rightarrow CaSO_3$$

(6)

The overall reaction is the sum of equations (5) and (6) as shown by equation (7).

$$Ca^{++} + SO_2 + H_2O \rightarrow 2H^+ + CaSO_3$$

(7)

The calcium sulfite is insoluble and is separated from the water by mechanical treatment means. The water, after having $SO_2$ added thereto, is passed to a coagulation tank and is maintained there for sufficient time to allow the $SO_2$ to react with the calcium ions and form calcium sulfite. The calcium sulfite which precipitates from the water is removed from the coagulation tank and the water is passed to a mechanical treater to remove the remainder of the precipitated calcium sulfite therefrom. The mechanical treater may be, for example, a filter, centrifuge or hydrocyclone. The calcium sulfite is removed from the mechanical treater and may be recovered or disposed of as desired and the softened water is exited from the mechanical treater for further use.

A commonly available sulfur dioxide-containing gas is a flue gas which results from the combustion of a sulfur-containing fuel. A sulfur dioxide-containing flue gas is a preferred gas to use in practicing this embodiment for two reasons. First, the flue gas is a waste gas and therefore is a very economical source of $SO_2$. Second, flue gases containing $SO_2$ have been considered to be polluting gases. Therefore, it is desirable to treat these gases to remove the $SO_2$ prior to exhausting the gases into the atmosphere and by using the flue gases in accordance with this embodiment they are treated and may then be exhausted to the atmosphere. Thus, this embodiment offers the very desirable ends of supplying soft water and of removing $SO_2$ from flue gases.

Flue gases also contain oxygen, however, and the oxygen oxidizes the sulfite ion to the sulfate ion ($SO_4^=$) as shown by equation (8).

$$SO_3^= + \tfrac{1}{2}O_2 \rightarrow SO_4^=$$

(8)

The calcium sulfite is thus oxidized to calcium sulfate which is almost 100 times more soluble than the calcium sulfite. Therefore, it is necessary to further treat the water to prevent the oxidation of calcium sulfite to calcium sulfate in order to be able to precipitate the calcium ions as calcium sulfite and remove them from the water, thereby providing soft water. Thus, in the embodiment where flue gases are used in the softening of water or where oxygen is otherwise present in or introduced into the water, an oxidation inhibitor is also injected into the water to prevent the oxidation of the calcium sulfite into calcium sulfate. Examples of suitable oxidation inhibitors are ascorbic acid, formaldehyde, benzyl alcohol, phenol, and hydroquinone. It is desirable that the oxidation inhibitor be injected in an amount sufficient to provide a concentration of oxidation inhibitor in the water of at least about 1 part per million and normally a concentration of no more than about 5 parts per million is needed to effectively inhibit the oxidation of calcium sulfite in the calcium sulfate.

The solubility of calcium sulfite in water increases with decreasing pH values below 6.0. At low pH values, calcium sulfite disassociates and forms calcium bisulfite as shown by equation (9).

$$CaSO_3 + 2H^+ + SO_3^= \rightarrow Ca^{++} + 2HSO_3^-$$

(9)

Thus, it is desirable to maintain the ph of the water being treated to a value of 6 or greater to maintain the calcium sulfite in insoluble form. Should the pH fall to lower values during the treatment it may be raised by the addition of alkali as shown by equation (10).

$$Ca^{++} + 2(PHSO_3)^- + 2OH^- \rightarrow CaSO_3 + H_2O + SO_3^J$$

(10)

In carrying out this embodiment for softening water by using flue gas, a preferred means for mixing the flue gas and water is by means of an emission scrubber as previously described. It is also desirable to maintain the pH at a value of at least 6 which may be done by the method previously described.

Figure 2:
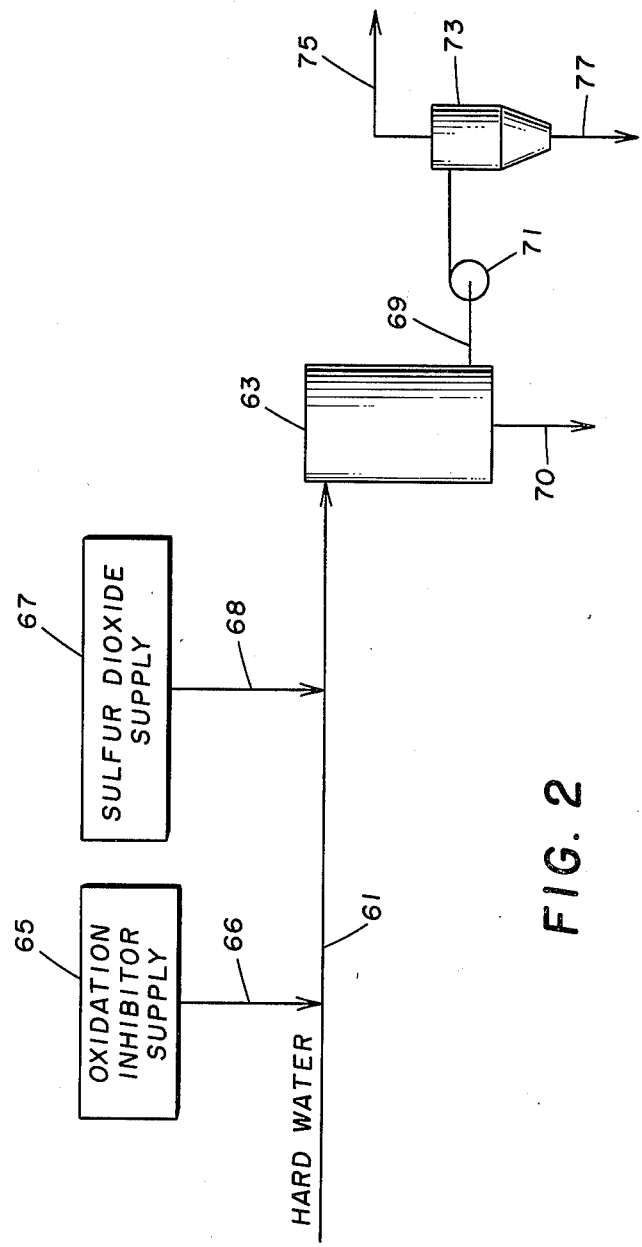
FIG. 2 is a schematic flow diagram illustrating an embodiment of this invention directed to softening water.

With reference to FIG. 2 there is shown a schematic diagram of a system for softening water in accordance with this embodiment. Hard water is flowed from the hard water source (not shown) through a line 61 and into a coagulation tank 63. The coagulation tank 63 may be a tank in which the water is maintained for a desired time to allow the calcium sulfite to form and coagulate therein. The emission scrubber 17, shown in FIG. 1, may be used as the coagulation tank or may be used in conjunction with a coagulation tank. Sulfur dioxide is flowed normally in gaseous form from a sulfur dioxide supply 67 and is mixed with the hard water. The sulfur dioxide may be flowed as shown in FIG. 2 from the sulfur dioxide supply 67 through line 68 and into line 61 where it there mixes with the hard water flowing therein. The sulfur dioxide may also be flowed for example in counterflow with the hard water through the coagulation tank as was previously described and shown by FIG. 1 with regard to the flue gas flowing in counterflow with the alkaline water through the emission scrubber vessel. It is desirable to mix at least a stoichiometric amount of sulfur dioxide with the hard water to react with the calcium therein to remove the calcium therefrom. An oxidation inhibitor is flowed from the oxidation inhibitor supply 65 through line 66 and mixed with the hard water that flows through line 61. The sulfur dioxide and oxidation inhibitor are thus mixed with the hard water and flowed into the coagulation tank 63 which may be, as previously mentioned, the emission scrubber 17 of FIG. 1. A line 70 with appropriate valves (not shown) is provided in the lower portion of coagulation tank 63 to remove precipitated calcium sulfite therefrom. The treated water is flowed from the coagulation tank 63 through line 69 and pump 71 to a mechanical treating means 73 for removing the precipitated calcium sulfite from the water. The mechanical treating means 73 may be, for example, a filter, centrifuge, or hydrocyclone. The precipitated calcium sulfite is flowed from the mechanical treating means 73 through line 77 to appropriate storage or disposal and soft water is flowed from the mechanical treating means 73 through line 75 to appropriate storage or end use.

We claim:

1. A method of producing petroleum from a petroleum-bearing formation penetrated by a well means comprising:
    a. generating a hot fluid by injecting feed water into a hot fluid generator and firing said hot fluid generator with a sulfur-containing fuel, said hot fluid generator emitting a flue gas containing sulfur oxides;
    b. injecting said hot fluid via said well means into said petroleum-bearing formation;
    c. producing petroleum via said well means from said petroleum-bearing formation;
    d. passing said flue gas containing sulfur oxides through an emission scrubber vessel;
    e. injecting an oxidation inhibitor into an alkaline water containing calcium ions;
    f. passing said alkaline water containing calcium ions and said oxidation inhibitor through said emission scrubber vessel in counterflow with said flue gas to scrub said sulfur oxides from said flue gas, to reduce the alkalinity of said alkaline water, to form calcium sulfite and to inhibit the oxidation of said calcium sulfite;
    g. maintaining the pH of said water of reduced alkalinity at a pH value of at least 6.0;
    h. discharging said scrubbed flue gas from said emission scrubber vessel;
    i. discharging said water of reduced alkalinity containing said calcium sulfite from said emission scrubber vessel; and
    j. separating said calcium sulfite from said water of reduced alkalinity.

2. The method of claim 1 wherein said oxidation inhibitor is selected from the group consisting of ascorbic acid, formaldehyde, benzyl alcohol, phenol, and hydroquinone.

3. The method of claim 2 wherein steam is said hot fluid and a steam generator is said hot fluid generator.

4. In a method of producing petroleum from a formation containing petroleum and alkaline water having calcium ions, said formation being penetrated by an injection well and a production well, the steps comprising:
    a. generating a hot fluid by injecting feed water into a hot fluid generator and firing said hot fluid generator with a sulfur-containing fuel, said hot fluid generator emitting a flue gas containing sulfur oxides;
    b. injecting said hot fluid via said injection well into said formation containing petroleum and alkaline water having calcium ions;
    c. producing petroleum and alkaline water having calcium ions via said production well from said formation;
    d. clarifying at least a portion of said produced alkaline water having calcium ions;
    e. injecting an oxidation inhibitor into said clarified alkaline water having calcium ions;
    f. passing said clarified alkaline water having calcium ions and said oxidation inhibitor through an emission scrubber vessel;
    g. passing said flue gas containing sulfur oxides through said emission scrubber vessel in counterflow with said clarified alkaline water having calcium ions and said oxidation inhibitor to scrub said sulfur oxides from said flue gas, to reduce the alkalinity of said clarified alkaline water, to form calcium sulfite, and to inhibit the oxidation of said calcium sulfite;
    h. discharging said scrubbed flue gas from said emission scrubber vessel;
    i. discharging said water of reduced alkalinity from said emission scrubber vessel; and
    j. treating said discharged water of reduced alkalinity to separate therefrom said calcium sulfite.

* * * * *